Nov. 26, 1968 J. N. PEARSE 3,413,526
RELAY FLIP-FLOP EMPLOYING MULTIPLE MAGNETIC FLUX SOURCES
Filed Sept. 10, 1965 2 Sheets-Sheet 1
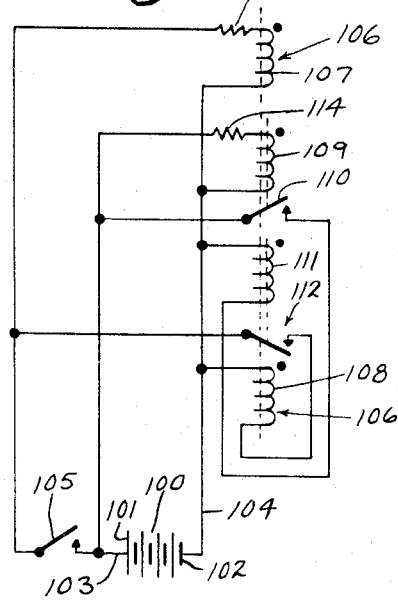
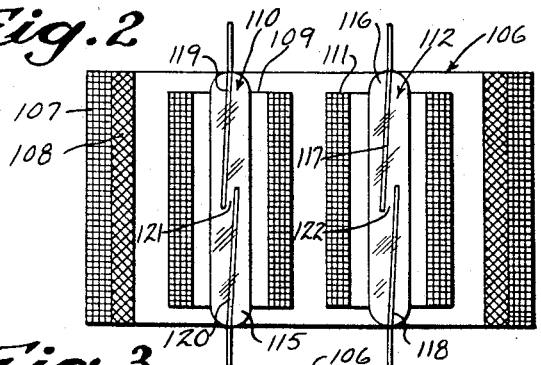
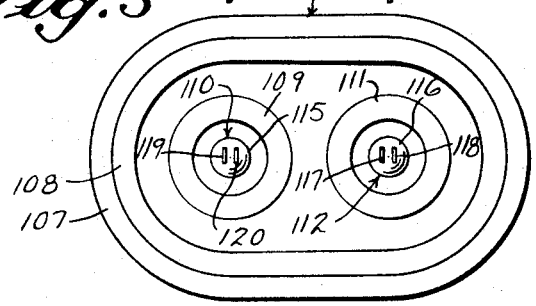
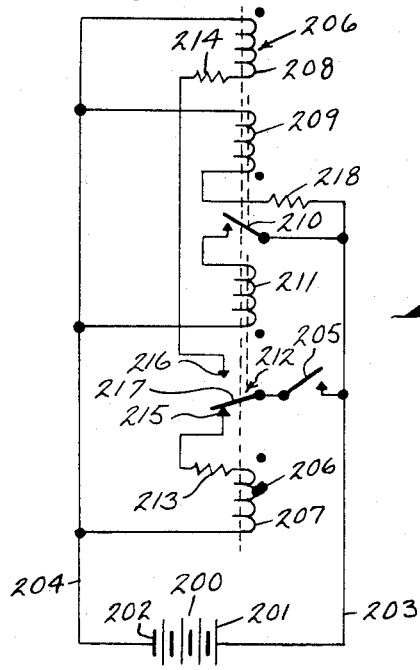
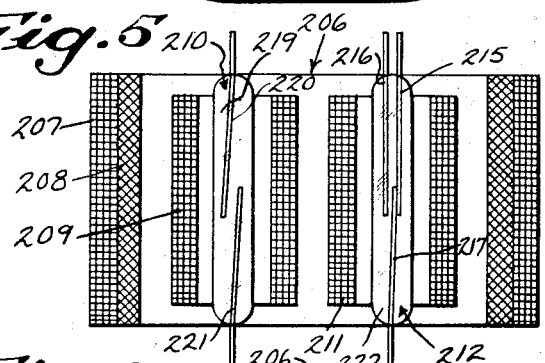
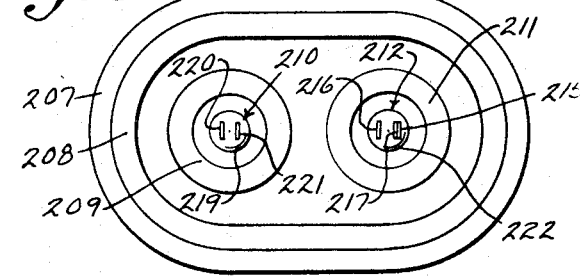
INVENTOR
JAMES N. PEARSE
BY Thomas O. Kloehn
ATTORNEY Nov. 26, 1968  J. N. PEARSE  3,413,526
RELAY FLIP-FLOP EMPLOYING MULTIPLE MAGNETIC FLUX SOURCES
Filed Sept. 10, 1965  2 Sheets-Sheet 2
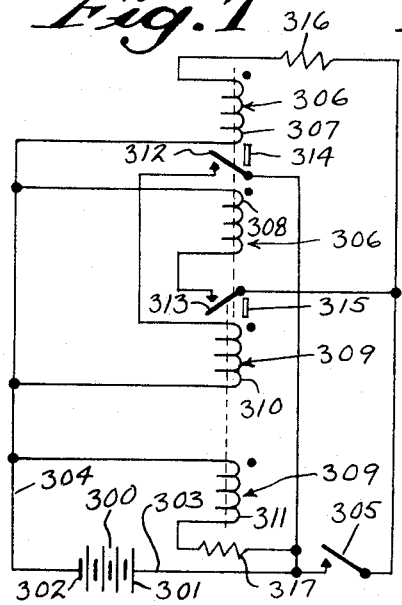
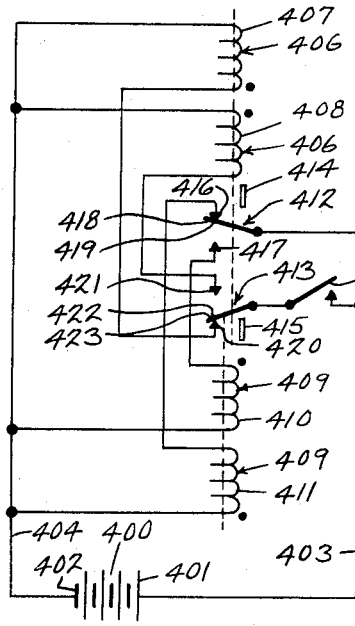
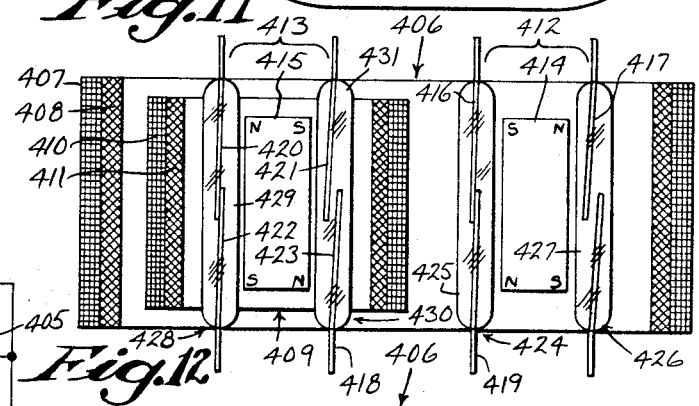
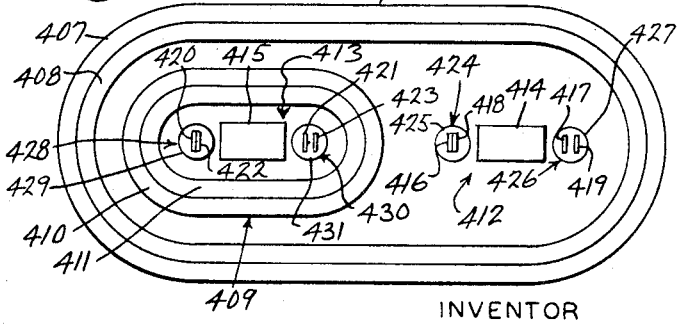
INVENTOR
JAMES N. PEARSE
BY Thomas O. Kloehn
ATTORNEY United States Patent Office 3,413,526
Patented Nov. 26, 1968

3,413,526
RELAY FLIP-FLOP EMPLOYING MULTIPLE
MAGNETIC FLUX SOURCES
James N. Pearse, Menomonee Falls, Wis., assignor to
Allen-Bradley Company, Milwaukee, Wis., a corporation of Wisconsin
Filed Sept. 10, 1965, Ser. No. 486,348
11 Claims. (Cl. 317—155.5)

ABSTRACT OF THE DISCLOSURE

The first two embodiments disclose two reed switches each having its own coil and a common double winding coil about both reed contacts. The second embodiment employs one single-pole double-throw contact and three limiting resistors which balance the flux generated. The third and fourth embodiments disclose two sets of reed contacts both of which have ferrite latching magnets, one of which has a double winding coil about it, and both of which have a double winding coil about them. The fourth embodiment employs two reed contacts in each set of reed contacts.

---

The present invention relates to a relay flip-flop and more particularly the invention resides in a flip-flop circuit including two sets of contacts, a magnetic latching means to latch the first of said two sets of contacts, a coil which when energized will actuate the second set of contacts, a common coil having at least two windings and being positioned to generate flux when energized which will act on both of said two sets of contacts, the coil actuating the second set of contacts being electrically connected to be energized through said first set of contacts, and said common coil being electrically connected so that at least one winding is energized through said second set of contacts. Also, the invention resides in a reed relay module adapted to be connected for use as said flip-flop circuit in that it has two sets of reed relay contacts, a common coil having at least two windings surrounding both of said sets of contacts, means for producing latching flux for the other of said two sets of contacts, and an inner coil surrounding only one of said sets of contacts.

An electrical flip-flop may be defined as a bistable frequency divider. While its applications are manifold, a currently large demand for new flip-flops is in the design and manufacture of computer and control systems, where flip-flops are frequently employed in large numbers as components. In such systems, a number of flip-flops may be connected together as shift registers, or counters, and the like, to perform a wide variety of information sequencing and storage functions. Electronic flip-flops are frequently employed because of their high speed of operation and miniature size, but electronic flip-flops have certain limitations which make their use in many systems less than desirable, and relay flip-flops may respond to the requirements of those systems more satisfactorily.

Relay flip-flops, while neither so fast nor so small as some elctronic flip-flops, are uniquely capable of providing complete isolation of input and output signals, so that output signals may be provided that are immediately usable without amplification or other modification or transmutation. Relay flip-flops may also operate from a plurality of input signals to produce an indefinite number of widely varying output signals. Relay flip-flops of the present invention not only manifest in abundance the advantages mentioned, but they achieve those advantages with singular circuit economy by minimizing the number of components and substituting for all electronic components the two most thoroughly tried and proved to be reliable of all electrical circuit components, mechanical contacts and resistors. In short, reliability, stability and versatility are hallmarks of the present invention. These advantages are achieved by the present invention through the use of circuits and structure wherein a plurality of magnetic fields are created in one relay to be algebraically added to actuate a minimum of two sets of relay contacts in a predetermined manner.

Reed relay modules, constituting a part of the present invention, provide a modular construction whereby all of the components of the flip-flops are contained in a unitary assembly which is compact, rugged, and durable, as well as easily accessible for maintenance purposes. Reed relays are made up of slender, flexible, flux conducting and electrically conducting reeds mounted in opposite ends of a glass envelope to project outwardly from the ends of the envelope for connection into the circuit and to project inwardly through the envelope so that their free ends overlap and create a working gap between them. Magnetic fluxes emanating from a source, such as permanent magnets, or coils, outside of the envelope may be conducted by the reeds so as to cause the overlapped ends to join in electrical contact or to break apart. The employment of dry reed relays is preferred, although other types are available, since dry reed relays provide a combination of high speed operation, immunity from contamination from the environment and long life, which attributes make them especially desirable in most flip-flop applications.

Accordingly, the primary objects and advantages of the present invention may be summarized in the following list:

To provide a highly versatile flip-flop.
To provide a highly reliable and stable flip-flop.
To provide a flip-flop having permanent memory.
To provide a high speed relay flip-flop.
To provide a compact relay flip-flop.
To provide a relay flip-flop that is immune from environmental contamination.
To provide an economical relay flip-flop.
To provide a flip-flop capable of leading edge or trailing edge operation.
To provide a flip-flop requiring a minimum number of components.
To provide a flip-flop operating from a plurality of input signals.
To provide a flip-flop having no electronic components.
To provide a flip-flop wherein input and output signals are isolated from one another.
To provide a flip-flop capable of producing numerous output signals.
To provide a flip-flop capable of algebraically adding magnetic flux from a plurality of sources.

Four preferred embodiments of the present invention are illustrated in the drawings, and will be described in detail hereafter, setting forth the best mode contemplated of carrying out this invention. This written description of these embodiment shall include a description of the invention and of the manner and process of making and using it, in such full, clear, concise, and exact terms as to enable any person skilled in the art to which it pertains, or with which it is most nearly connected, to make and use the same. However, the specific embodiments disclosed in the drawings and the written description are not to be confused with the invention, in which those embodiments merely participate. On the contrary, the subject matter regarded as the invention is particularly pointed out and distinctly claimed in the numbered claims at the conclusion of the specification following the description.

In the drawings:

FIG. 1 is a schematic diagram of the first embodiment of a relay flip-flop circuit according to the present invention, FIG. 2 is a side elevation in section of a diagrammatic representation of a reed relay module containing the circuit components appearing in the circuit diagram of the flip-flop circuit embodiment shown in FIG. 1, FIG. 3 is a top view in section of the representation of the reed relay module shown in FIG. 2, FIG. 4 is a schematic diagram of a second embodiment of a relay flip-flop circuit according to the present invention, FIG. 5 is a diagrammatic representation of a side elevation in section of a reed relay module containing the relay circuit components of the circuit diagram of FIG. 4, FIG. 6 is a top view in section of the representation of the reed relay module shown in FIG. 5, FIG. 7 is a schematic diagram of a third embodiment of the flip-flop circuit according to the present invention, FIG. 8 is a diagrammatic representation of a side elevation in section of a reed relay module containing the relay elements of the circuit in FIG. 7, FIG. 9 is a top view in section of the representation of the module shown in FIG. 8, FIG. 10 is a schematic diagram of a fourth embodiment of the flip-flop circuit according to the present invention, FIG. 11 is a diagrammatic representation of a side elevation in section of a reed relay module containing the elements of a flip-flop circuit shown in FIG. 10, and FIG. 12 is a top view in section of the representation of the module shown in FIG. 11.

In the drawings several devices are employed in an effort to represent pictorially the operation of the embodiments shown. Since one set of contacts may be acted upon by as many as four windings of two coils or as few as two windings of one coil, broken lines are used to indicate which windings act upon which contacts. Polarity dots are employed to indicate the orientation of the magnetic fields generated by the coils. The contacts employed respond indiscriminately to magnetic flux of either polarity. Hence, any winding connected to actuate a set of contacts out of the normal condition shown in the drawings will be termed an "on" winding, and one connected to restore actuated or energized contacts to their normal or deenergized condition will be termed an "off" winding. The end of a winding adjacent the polarity dot in the drawings will be called the "input" end and the end remote from the polarity dot will be called the "return" end, but this terminology is mere shorthand, as it were, and does not import function. The various contacts are drawn, insofar as possible, to actuate in directions appropriate to the relative orientation of the flux generated by their respective "on" windings.

*First embodiment*

Referring now to FIGS. 1, 2 and 3 of the drawings, and beginning specifically with FIG. 1 which shows a schematic diagram of a relay flip-flop, a unidirectional current source 100, represented by the symbol for a battery having a positive pole 101 and a negative pole 102, appears at the bottom of the diagram. The positive pole 101 is connected to an input bus 103 and its negative pole 102 connected to a return bus 104. An input switch 105 is connected to the input bus 103. The relay has a common coil 106 with an on winding 107 and an off winding 108. In addition to the common coil 106, the relay has a latching coil 109 which acts only on a first set of normally open contacts 110, and an inner coil 111 which acts only on a second set of normally open contacts 112. The common coil 106 is so called because it acts on both the first and the second sets of contacts 110 and 112.

To create the flip-flop circuit shown in FIG. 1, one end of each of the windings 107 and 108 of the common coil 106 and one end each of the latching coil 109 and of the inner coil 111 is connected to the return bus 104. The on winding 107 of the common coil 106 has its input end, which is designated in the drawing by an adjacent polarity dot, connected in series with a current limiting resistor 113 and the input switch 105 to the input bus 103. The off winding 108 has its return end, which is designated in the drawing by the absence of an adjacent polarity dot, connected in series with the second set of contacts 112 and the input switch 105 to the input bus 103. The latching coil 109 has its input end connected in series with a current limiting resistor 114 directly to the input bus 103.

A reed relay module is diagrammatically represented in FIGS. 2 and 3 showing the essential physical structure of a relay used in the flip-flop shown in FIG. 1. Where applicable, the same reference numerals are used in FIGS. 1, 2 and 3 to designate identical components in an embodiment of FIG. 1 using the module of FIGS. 2 and 3. The common coil 106 with its two windings 107 and 108 forms a housing and structural support for the latching coil 109 surrounding and containing the first set of contacts 110 and the inner coil 111 surrounding and containing the second set of contacts 112.

The first and second sets of contacts 110 and 112 are identical, normally open, dry reed relay contacts such as are well known in the art. Each has a glass envelope 115 and 116, respectively, with a pair of resilient, highly permeable and highly conductive reeds 117, 118 and 119, 120, respectively, embedded in opposite ends. One end of each reed 117, 118 and 119, 120 projects outwardly of the respective glass envelope 115 or 116 for connection to circuit conductors, and the other end of each reed 117, 118 and 119, 120 is cantilevered to project centrally in an axial direction while normally deflecting outwardly in a radial direction. Hence, overlapping cantilevered ends of pairs of reeds 117, 118 and 119, 120, respectively, are normally separated by a working gap 121 and 122, respectively. Magnetic flux will find a low reluctance path through the reeds 117, 118 or 119, 120 and across their respective working gaps 121 or 122. When the flux density reaches a predetermined range, the attractive magnetic forces of the pairs of reeds 117, 118 or 119, 120 overcomes the mechanical strength of the reeds and they are drawn into mutual contact, closing the gap 121 or 122, and thus closing an electrical circuit through the reeds 117, 118 or 119, 120. When the attractive force generated by the magnetic flux recedes to less than the resilient strength of the reeds 117, 118 or 119, 120, the reeds 117, 118 or 119, 120 spring back to their normally open condition.

The latching coil 109 and the inner coil 111 are shielded one from another, following known techniques, so that each acts only upon the set of contacts 110 and 112, respectively, it surrounds. That is not to imply that each is necessarily contained within an enclosing envelope of magnetic material to achieve absolute isolation, but rather, "shielding" here includes a variety of combinations of devices used to create preferential paths for the fluxes generated by each coil 109 and 111 such that those fluxes will not interfere with the desired operation of the opposite sets of contacts 112 and 110 when the relay module is operating within its designed limits. The windings 107 and 108 of the common coil 106 generate flux to act with equal efficacy on both of said sets of contacts 110 and 112. The quantity of flux generated by any of the coils 109, 111 or windings 107 and 108 is, of course, a function of the ampere turns product, or NI.

For the purpose of describing the four embodiments diagrammed in the drawings, several simplifying conditions may be assumed: all windings and single winding coils are identical in all respects; all contacts are identical in all respects; and the shielding in each case is perfect so that the only flux acting upon any set of contacts is that from the source indicated in the drawing. As is well known, not one of those conditions would exist in practice, and the art possesses a vast and growing fund of techniques for compensating each imperfection so that a practical operational result can be achieved as if the variations and imperfections did not exist. Some of these techniques may be the result of highly significant inventions in their own right, and are no part of the present invention. Hence, this description and the claims to follow assume both the practical realities and the techniques for avoiding any undesired effects resulting from them, and any language that may lend itself to an interpretation which would require the ideally perfect situation is not to be so construed.

At the initial stage in the operation of the relay flip-flop circuit shown in FIG. 1 only the latching coil 109 acting on the first set of contacts 110 is energized, inasmuch as it is connected directly across the current source 100 without intermediate switches or contacts and is therefore always energized. However, due to the current limiting resistor 114 in series with the latching coil 109, the current level is substantially reduced so that the ampere-turns or NI of the latching coil 109 is insufficient to produce magnetic flux capable of actuating the first set of contacts 110.

When the input switch 105 is closed creating the leading edge of the first input pulse, current flows from the positive pole 101 of the source 100 through the input switch 105 and the current limiting resistor 113 to energize the on winding 107 of the common coil 106 and thence back through the return bus 104 to the negative pole 102 of the unidirectional source 100. The current limiting resistor 113 in series with the on winding 107 of the common coil 106 similarly reduces the current level to the point where the NI generates insufficient magnetic flux to actuate either the first or the second set of contacts 110 or 112 when it acts alone. However, the flux generated in the on winding 107 aids flux generated in the latching coil 109 relative to the first set of contacts 110 so that the sum of the two fluxes is sufficient to close the first set of contacts 110. When the first set of contacts 110 close, the inner coil 111, which acts upon the second set of contacts 112, is connected across the source 100. The current through the inner coil 111 enters from the return end, and the flux generated by the inner coil 111 is opposed by the flux generated by the on winding 107 of the common coil 106. The resultant flux from the algebraic addition of these two fluxes acting on the second set of contacts 112 is insufficient to close those contacts 112.

However, when the input switch 105 is opened on the trailing edge of the first input pulse, the on winding 107 of the common coil 106 is deenergized, leaving the constant current through the latching coil 109 to generate a latching flux sufficient to latch the first set of contacts 110 in the closed position. With the first set of contacts 110 closed, the inner coil 111 remains energized, since it is connected through the first set of contacts 110 across the source 100. Therefore, as soon as the on winding 107 of the common coil 106 is deenergized, the flux, which had been generated by the on winding 107 and which had prevented the second set of contacts 112 from closing, is eliminated and the second set of contacts 112 now closes under the influence of the inner coil 111.

When the input switch 105 is closed at the leading edge of the second input pulse, with the second set of contacts 112 closed, current passes through the off winding 108 of the common coil 106 entering from the return end of the off winding 108. The flux generated by the off winding 108 will aid the flux generated by the inner coil 111, but it will oppose the flux generated in the latching coil 109 and the on winding 107 of the common coil 106. As a result, the second set of contacts 112 will remain closed, but the first set of contacts 110 will be opened, inasmuch as the sum of the fluxes from the reduced NI of the on winding 107 and the latching coil 109 is cancelled by the opposing flux from the off winding 108 of the common coil 106.

When the input switch 105 is now opened, creating the trailing edge of the second input pulse and deenergizing the on winding 107 and the off winding 108 of the common coil 106, the second set of contacts 112, which had been held in the closed position by flux from the off winding 108 of the common coil 106, is permitted to return to its normal, open condition.

It is apparent from the foregoing that the first set of contacts 110 of this embodiment of the invention operates on the leading edge of the input pulse whereas the second set of contacts 112 operates on the trailing edge of the input pulse. Accordingly, this embodiment of the present invention can provide either leading edge or trailing edge output as the system in which it is applied may require. An output may be obtained by adding another set of contacts adjacent to either the first set of contacts 110 or the second set of contacts 112 as desired. It is also apparent that the latching coil 109 for the first set of contacts 110, inasmuch as it is constantly energized, could be replaced by a permanent magnet, and that the input switch 105 and the source 100 could be replaced by a clocking signal which would produce a pulse signal in the nature of a square wave.

*Second embodiment*

Turning now to FIGS. 4, 5 and 6 and beginning with the schematic diagram of FIG. 4 illustrating a second embodiment of the present invention, a unidirectional current source 200 with a positive pole 201 and a negative pole 202 is shown at the bottom of the figure. An input bus 203 is connected to the positive pole 201 and a return bus 204 is connected to the negative pole 202 of the source 200. An input switch 205 is connected to the input bus 203.

As in the first embodiment, here the relay is made up of a common coil 206 that has an on winding 207 and an off winding 208, which are shown at the bottom and top of the diagrams respectively. Within the common coil 206 is a latching coil 209 which acts upon a first set of normally open contacts 210, and an inner coil 211 which acts upon a second set of contacts 212. The second set of contacts 212, as distinguished from the first set of contacts 210, are single-pole double-throw type of contacts. To connect that relay into the flip-flop shown in FIG. 4, one end of each of the windings 207 and 208 of the common coil 206 and one end of the latching coil 209 and the inner coil 211 are connected in common to the return bus 204. The input end of the on winding 207 and the return end of the off winding 208 of the common coil 206 are connected, respectively, through current limiting resistors 213 and 214 to parallel stationary contacts 215 and 216 of the second set of contacts 212. A common contact 217 of the second set of contacts 212 is connected to the input switch 205. The input end of the latching coil 209 is connected through a current limiting resistor 218 to the input bus 203, and the return end of the inner coil 211 is connected through the first set of contacts 210 to the input bus 203.

FIG. 5 shows the structure of a reed relay module for the flip-flop circuit shown in FIG. 4. The common coil 206 with its two windings 207 and 208 surround the entire module and define a central cavity in which the first set of contacts 210 with its latching coil 209 around it and the second set of contacts 212 with the inner coil 211 around it are mounted. Both the latching coil 209 and the inner coil 211 are single winding coils. The first set of contacts 210 is a conventional dry reed relay contact of the type described in connection with the first embodiment, and has glass envelope 219 in which flexible reeds 220 and 221 are mounted. However, the second set of contacts 212 is a special type of dry reed relay contact having the usual glass envelope 222 but containing the two stationary contacts 215 and 216, respectively, and a third or common contact 217. It is not entirely descriptively accurate to refer to both of the stationary contacts 215 and 216 as being stationary, since only one stationary contact 215 of the two is stationary, and it is made of a rigid, electrically conductive but nonmagnetic material, whereas the other stationary contact 216 is the usual flexible, magnetic, electrically conductive reed. However, inasmuch as the reed contact 212 itself is not claimed here as an invention the term "stationary contact" may be applied to both the contacts 215 and 216 between which the common contact 217 moves. The common contact 217 is cantilevered to be normally in contact with the rigid, non-magnetic stationary contact 215. When the flux passing through the flexible, magnetic stationary contact 216 and common contact 217 is great enough, those two contacts 216 and 217 are drawn together and the common contact 217 is drawn away from the rigid, nonmagnetic stationary contact 215.

The operation of this second embodiment closely parallels that of the first embodiment. The latching coil 209 is constantly energized through the current limiting resistor 218 so that the flux generated by its NI is not sufficient to close the first set of contacts 210. When the input switch 205 is closed, creating the leading edge of the first pulse, current passes from the source 200 through the input switch 205, the common contact 217 of the second set of contacts 212, the stationary contact 215, the current limiting resistor 214 and the on winding 207 of the common coil 206. This current enters the winding 207 from its input end and produces a flux acting upon the first set of contacts 210 in the same direction as the flux from the latching coil 209 so as to aid the flux of the latching coil 209 and produce a resultant flux sufficient to close the first set of contacts 210. The closing of the first set of contacts 210 completes a circuit through the inner coil 211 and the currents enters the inner coil 211 from its return end to generate a flux in opposition to the flux from the on winding 207 of the common coil 206. The resultant magnetic force on the second set of contacts 212 from the flux of the inner coil 211 and the on winding 207 of the common coil 206 is insufficient to actuate the contacts 212.

When the input switch 205 is opened at the trailing edge of the first input pulse, the on winding 207 of the common coil 206 is deenergized, and on the first set of contacts 210 are latched in the closed position by the constantly energized latching coil 209. Since the flux from the inner coil 211 is no longer opposed by flux from the on winding 207 of the common coil 206, the resultant flux now acting on the second set of contacts 212 is sufficient to actuate those contacts. The actuation of the second set of contacts 212 moves the common contact 217 from its normal position in contact with the rigid stationary contact 215 into contact with the flexible stationary contact 216. However, since the input switch 205 is opened, no current is conducted through the second set of contacts 212, and the flip-flop will remain with both of its sets of contacts 210 and 212 in energized positions until the second input pulse.

When the input switch 205 is closed for the second time, creating a leading edge of the second input pulse, current passes through the input switch 205, the second set of contacts 212, a current limiting resistor 214 and the off winding 208 of the common coil 206. This current enters the off winding 208 at its return end to generate in the off winding 208 a flux tending to hold the second set of contacts 212 in its energized position, but opposing and cancelling the flux from the latching coil 209 on the first set of contacts 210. The first set of contacts 210 is thus permitted to return to its normally open condition. As long as the input switch 205 remains closed so that the off winding 208 of the common coil 206 is energized, the second set of contacts 212 will remain in an energized position.

When the input switch 205 is opened, creating the trailing edge of the second input pulse, the common coil 206 is deenergized permitting the second set of contacts 212 to return to its normal condition, as shown in the drawing.

As with the embodiment shown in FIG. 1, it will be apparent that the latching coil 209 of the second embodiment could be replaced by a permanent latching magnet, since the only function of the latching coil 209 is to provide a constant latching flux for the first set of contacts 210. Also, as with the first embodiment, the input switch 205 and the source 200 could be replaced by a pulse input signal, as for example a clocking pulse, which could be in the nature of a square wave, unidirectional pulse. The frequency of the operating pulse would, of course, be limited by the operating time required for the energization of the coils and the actuation of the contacts 210 and 212.

Third embodiment

Turning now to the third embodiment shown in FIGS. 7, 8 and 9, FIG. 7 is a schematic diagram of a relay flip-flop circuit. At the bottom of the diagram is a unidirectional current source 300 having a positive pole 301 and a negative pole 302, with the positive pole 301 connected to an input bus 303, and a negative pole 302 connected to a return bus 304. An input switch 305 is connected to the input bus 303.

As in the previous embodiments, there is a common coil 306 made up of an on winding 307 and an off winding 308, but in FIG. 7 the windings 307 and 308 of the common coil 306 are shown adjacent one another at the top of the drawing. The relay of this embodiment employs an inner coil 309 that also has an on winding 310 and a biasing off winding 311, and it has two sets of contacts 312 and 313 and each set of contacts 312, 313 has a permanent latching magnet 314, 315, respectively, positioned to latch it in a closed position.

The on winding 307 of the common coil 306 has its return end connected to the return bus 304 and its input end connected through a current limiting resistor 316 and the input switch 305 to the input bus 303. The off winding 308 of the common coil 306 has its input end connected to the return bus 304 and its return end connected through the second set of contacts 313 and the input switch 305 to the input bus 303. The on winding 310 of the inner coil 309 has its return end connected to the return bus 304 and its input end connected through the first set of contacts 312 to the input bus 303, and the biasing off winding 311 of the inner coil 309 has its input end connected to the return bus 304 and its return end connected through a current limiting resistor 317 to the input bus 303.

FIGS. 8 and 9 illustrate the structure of a reed relay module containing the relay elements for the flip-flop circuit shown in FIG. 7. The common coil 306, with its two windings 307 and 308, encloses the entire module and has a central cavity containing both the first set of contacts 312 with its permanent latching magnet 314 adjacent it and the second set of contacts 313 with its adjacent permanent latching magnet 315 enclosed in the two windings 310 and 311 of the inner coil 309.

The latching magnets 314 and 315 are shown to have similar poles at diagonally opposite corners and opposite poles at adjacent corners, which arrangement would be impossible if these were common iron magnets. However, in the embodiment shown, iron magnets are not used for the permanent latching magnets 314 and 315. Instead, ceramic barium ferrite magnets are used, which are dielectric materials having permeability approximately equal to air, and as a result, can be magnetized in discrete areas to produce any desired magnetic field orientation and strength. This flexibility made possible by ferrite magnets has particular practical importance here where the flip-flop module relies for its operation upon the algebraic addition of magnetic forces from a plurality of flux sources some of which are of opposite polarity.

The first and second sets of contacts 312 and 313 are ordinary, normally open, dry reed contacts, such as those described in connection with the first embodiment. The dry reed contacts 312, 313 have glass envelopes 318, 319, respectively, in which magnetically and electrically conductive reeds 320, 321 and 322, 323, respectively, are mounted so that opposite ends of the reeds 320, 321 and 322, 323 project out to form terminals for circuit conductor, and adjacent ends of the reeds 320, 321 and 322, 323, which project axially inwardly are cantilevered radially outward so that where they overlap they normally define working gaps 324, 325, respectively, between them.

One important distinction between the third embodiment and the preceding first two embodiments of the present invention to bear in mind in considering the operation of the third embodiment is that each of the windings 307, 308 and 310, 311 both the common coil 306 and the inner coil 309 are employed in the circuit as operating windings with NI generating sufficient magnetic flux to actuate the contacts on which they act. The purpose of current limiting resistors 316 and 317 is not to utilize the respective windings in a latching function, but rather to achieve the desired resultant in the algebraic addition of the fluxes generated.

In the initial stage of operation the flip-flop is in the normal condition shown in FIG. 7 with both sets of contacts 312 and 313 open. The latching magnets 314 and 315 adjacent the contacts 312 and 313, respectively, produce insufficient MMF to close the contacts 312 and 313. The biasing off winding 311 of the inner coil 309 generates a constant flux that opposes the flux of the latching magnet 314 acting on the second set of contacts 313.

When the input switch 305 is closed to effect the leading edge of the first input pulse, current through the current limiting resistor 316 and the on winding 307 of the common coil 306 generates flux aiding the flux of the latching magnet 314 adjacent the first set of contacts 312 and opposing the flux of the latching magnet 315 adjacent the second set of contacts 313. Therefore, the first set of contacts 312 closes connecting the on winding 310 of the inner coil across the source 300. However, since the flux of the on winding 310 of the inner coil 309, though aided by the latching magnet 315, is opposed by the flux generated by both the on winding 307 of the common coil 306 and the biasing off winding 311 of the inner coil 309, the second set of contacts 313 will remain open.

When the input switch 305 is opened at the trailing edge of the first input pulse, the on winding 307 of the common coil 306 is deenergized, and the first set of contacts 312 is latched closed by the latching magnet 314. Hence, the mutually aiding fluxes of the on winding 310 of the inner coil 309 and the latching magnet 315 combine with the opposing flux of the biasing off winding 311 to produce a resultant force sufficient to close the second set of contacts 313. With the second set of contacts 313 closed, the off winding 308 of the common coil 306 is energized to generate flux in opposition to the latching magnet 314 holding the first set of contacts 312 closed and aiding the flux of the latching magnet 315 holding the second set of contacts 313 closed. Hence, the first set of contacts 312 is restored to its normally open position, but the second set of contacts 313 remains closed.

When the input switch 305 is opened at the trailing edge of the second pulse, the off winding 308 of the common coil 306 is deenergized leaving only the latching magnet 315 and the biasing off winding 311 of the inner coil 309 acting on the second set of contacts 313. Since the fluxes from the latching magnet 315 and the biasing off winding 311 are in opposition and their resultant force is insufficient to hold the second set of contacts 313 closed, those contacts 313 will open. Thus the flip-flop is restored to its normal condition.

As with the previous embodiment, a pulse source could be substituted for the input switch 305 and the constant source 300, and a permanent magnet could be substituted for the biasing off winding 311 of the inner coil 309.

*Fourth embodiment*

The fourth embodiment of the invention is illustrated in FIGS. 10, 11 and 12, and referring specifically to FIG. 10 a unidirectional current source 400 appears at the bottom of the circuit diagram having a positive pole 401 and a negative pole 402. Connected to the positive pole 401 is an input bus 403 and a return bus 404 connected to the negative pole 402. An input switch 405 is connected to the input bus 403. The relay is actuated by a common coil 406 made up of an on winding 407 and an off winding 408, and by an inner coil 409 that also has an on winding 410 and an off winding 411. The coils 406 and 409 are so mounted that the common coil 406 will act upon a first set of contacts 412 and a second set of contacts 413, but the inner coil 409 will act upon only the second set of contacts 413. A latching magnet 414, 415 is provided for each of the sets of contacts 412, 413 respectively. The first set of contacts 412 and the second set of contacts 413 are both single-pole double-throw type of contact arrangements; the first set of contacts having two stationary contacts 416 and 417 and a common contact 418–419, and the second set of contacts 413 having two stationary contacts 420–421 and a common contact 422–423.

The structure of a relay module for the flip-flop shown in FIG. 10 is illustrated in FIGS. 11 and 12, where the common coil 406 with its windings 407 and 408 define a central cavity in which are mounted the first set of contacts 412 and the second set of contacts 413 along with their respective permanent latching magnets 414 and 415 and the inner coil 409 with its two windings 410 and 411 surrounding the second set of contacts 413. The single-pole double-throw arrangement of first set of contacts 412 is achieved with a latched closed dry reed contact 424 and a normally open dry reed contact 426. These dry reed contacts 424 and 426 are the same type of components as those described in the previous embodiments, and they have glass envelopes 425 and 427 respectively in which pairs of magnetic, electrically conductive, flexible reeds 416, 418 and 417, 419 respectively are mounted. The second set of contacts 413 is also made up of two dry reed contact structures 428 and 430, the normally open dry reed contact 430 having reed elements 421 and 423 and the latched closed dry reed contact 428 having reed elements 420 and 422. In the first set of contacts 412, two of the reeds 418 and 419 may be connected together to serve as a common contact 418–419 and in the second set of contacts 413 two of the reeds 422 and 423 also may likewise be connected together to serve as a common contact 422–423. Here also, the permanent latching magnets 414 and 415 are ferrite type latching magnets having like poles in diagonally opposite corners and unlike poles at adjacent corners, as was described in connection with the third embodiment.

To create the flip-flop circuit shown in FIG. 10, one end of each of the windings 407, 408 and 410, 411 of the coils 406 and 409 is connected directly to the return bus 404. It remains to describe the connection of the other ends of the windings 407, 408, 410 and 411. In the common coil 406, the on winding 407 has its input end connected to the latched closed stationary contact 420, and the return end of the off winding 408 is connected to the normally open stationary contact 421 of the second set of contacts 413. In the inner coil 409, the input end of the on winding 410 is connected to the normally open stationary contact 417, and the return end of the off winding 411 is connected to the normally closed stationary contact 416 of the first set of contacts 412. The common contact 418–419 of the first set of contacts 412 is connected directly to the input bus 403, and the common contact 422–423 of the second set of contacts 413 is connected to the input bus 403 through the input switch 405.

Note that the polarities of the fluxes emanating from the two sides of the latching magnets 414 and 415 to act on the immediately adjacent contacts 424, 426 and 428, 430, respectively, are of opposite polarities. Note also that the polarities of the two latching magnets 414 and 415 are mirror images. Therefore, in the initial, normal condition of the flip-flop, when only the off winding 411 of the inner coil 409 is energized, the flux generated by the off winding 411 aids that portion of the flux of the latching magnet 415 that would latch the relay 428 closed and it opposes the other flux emanating from the latching magnet 415 and thus serves to maintain the normally open contact 430 in its open condition.

When the input switch 405 is closed creating the leading edge of the first input pulse, current flows through the second set of contacts 413 to energize the on winding 407 of the common coil 406. The flux generated by the on winding 407 of the common coil 406 opposes the latching magnet 414 flux that latches the latched closed contacts 424 and aids the latching magnet 414 flux acting upon the normally open contacts 426 in the first set of contacts 412. Hence, the first set of contacts 412 is actuated, closing the common contact 418–419 to the normally open stationary contact 417 and opening the common contact 418–419 away from the latched closed contact 416. The simultaneous effect of the flux from the on winding 407 of the common coil 406 on the second set of contacts 413 is merely to aid the flux of the off winding 411 of the inner coil 409, leaving the condition of the second set of contacts 413 unchanged. However, when the first set of contacts 412 are actuated, the off winding 411 of the inner coil 409 is deenergized and the on winding 410 of the inner coil 409 is energized generating flux in opposition to the flux of the on winding 407 of the common coil 406.

Hence, when the input switch 405 is opened on the trailing edge of the first input pulse, deenergizing the on winding 407 of the common coil 406, the flux of the on winding 410 of the inner coil 409, when added to the flux of the latching magnet 415, actuates the second set of contacts 413. This result obtains since the flux of the on winding 410 of the inner coil 409 opposes the permanent magnet 415 flux latching the latched closed contacts 428 and aids the permanent magnet 415 flux acting on the normally open contacts 430. With the actuation of the second set of contacts 413, the off winding 408 of the common coil 406 is connected to the input switch 405 and the on winding 407 of the common coil 406 is disconnected from the input switch 405.

Hence, when the input switch 405 is again closed creating the leading edge of the second input pulse, the off winding 408 of the common coil 406 is energized, actuating the first set of contacts 412 back to its normal condition. However, the flux of the off winding 408 of the common coil 406 aids the flux of the on winding 410 of the inner coil 409 until the on winding 410 is deenergized by the actuation of the first set of contacts 412, when the flux of the off winding 408 of the common coil 406 merely serves to cancel the flux of the now energized off winding 411 of the inner coil 409. Hence the flip-flop is in a state of equilibrium with the first set of contacts 412 in the normal condition and the second set of contacts 413 latched in the energized condition.

When the input switch 405 is opened on the trailing edge of the second input pulse, the off winding 408 of the common coil 406 is deenergized, so the off winding 411 of the inner coil 409 and the latching magnet 415 act together to restore the second set of contacts 413 to their normal condition. Thus the flip-flop is restored to its normal condition as shown in the drawing.

As with the previous embodiment, it will be apparent that in the fourth embodiment the current source 400 in the input switch 405 may be eliminated in favor of a pulse input source and similarly the permanent latching magnets 414 and 415 may find substitutes in permanently energized coils. Additional contact means may also be added to provide output signals and the like. Although in the circuit diagram of the fourth embodiment a single-pole double-throw contact structure is indicated, the actual contact arrangement used in the module is not the same as the single-pole double-throw contact structure shown in FIG. 5. Instead, an alternative combination is utilized employing two dry reed contact structures, one normally open and the other normally closed. The disclosure of both embodiments here makes it abundantly clear that when the term "single-pole double-throw contact" is used, it is not intended that the structure referred to be confined to the classical switch arrangement normally indicated by those terms. Instead, the term "single-pole double-throw contact" is intended to include all contact arrangements which achieve substantially the same type of operation.

From the description of these four embodiments of the invention it will be apparent that the practice of the present invention may take many different forms. Hence, as the invention is not confined to the four embodiments shown so the many other forms and embodiments in which the invention may appear are not abandoned or dedicated to the public by the mere fact that they are not described herein. On the contrary, this invention is present in any structure or circuit which responds to any one or more of the following claims which set forth the subject matter of this invention.

I claim:

1. A reed relay flip-flop module comprising the combination of
    a first set of reed contacts;
    a second set of reed contacts;
    said first and second sets of reed contacts being individually actuatable;
    a first source of magnetic flux mounted to act only on said first set of reed contacts;
    a second source of magnetic flux mounted to act only on said second set of reed contacts;
    and a common coil having at least two windings adapted to provide fluxes of opposite polarities and being wound around both said first and second sets of reed contacts and said first and said second sources of magnetic flux to provide a magnetic field acting on both said first and said second sets of reed contacts when electrically energized, and one of said winding of said common coil being connected to be energized through one of said sets of reed contacts.

2. A reed relay flip-flop module as set forth in claim 1 wherein
    said first set of reed contacts is a normally open contact;
    said second set of reed contacts is a normally open contact;
    said first source of magnetic flux is a coil adapted to be electrically energized;
    and said second source of magnetic flux is a coil adapted to be electrically energized.

3. A reed relay flip-flop module as set forth in claim 1 wherein
    said first set of reed contacts is a normally open contact;
    said second set of reed contacts is a single-pole double-throw contact;
    said first source of magnetic flux is a coil adapted to be electrically energized;
    and said second source of magnetic flux is a coil adapted to be electrically energized.

4. A reed relay flip-flop as set forth in claim 1, wherein
    said first and said second sets of reed contacts are both normally open contacts;
    said first magnetic source is a permanent magnet;
    and said second magnetic source is a coil having at least two windings adapted to be energized to produce magnetic fluxes of opposite polarities.

5. A reed relay flip-flop module as set forth in claim 1, wherein
    said first and said second sets of reed contacts are each comprised of one normally open reed contact and one normally closed reed contact;
    said first magnetic source is a ferrite permanent magnet having like poles in diagonally opposite positions;
    and said second magnetic source includes a coil having at least two windings adapted to be electrically energized to produce magnetic fluxes of opposite polarities and a ferrite permanent magnet having like poles at diagonally opposite locations.

6. A relay flip-flop comprising the combination of a source for providing electrical input signals for operating said flip-flop;
an input switch connected to said source;
a first set of relay contacts;
a second set of relay contacts;
a magnetic latching means positioned to latch only said first set of relay contacts;
an inner coil positioned to actuate only said second set of relay contacts and having at least one winding connected through said first set of relay contacts across said source;
and a common coil positioned to act upon both said first and said second sets of relay contacts, having at least two windings connected across said source, at least one of said windings being connected in series with said first set of relay contacts, at least one of said windings being connected in series with said input switch, and said windings being adapted to generate opposing magnetic fields acting on said sets of contacts when energized.

7. A relay flip-flop circuit as set forth in claim 6 wherein
said first set of relay contacts are normally open;
said second set of relay contacts are normally open;
said magnetic latching means is a coil connected in series with a current limiting resistor across said source to effect an NI sufficient to latch said first set of relay contacts but too weak to actuate said first set of relay contacts;
and both of said windings of said common coil are connected in series with said input switch.

8. A relay flip-flop circuit as set forth in claim 6 wherein
said first set of relay contacts are normally open;
said second set of relay contacts are single-pole double-throw contacts having two stationary contacts and one movable contact connected to said input switch;
said magnetic latching means is a coil connected in series with a current limiting resistor across said source;
and said common coil has one of its windings connected in series with a current limiting resistor and one of said stationary contacts and another of its windings connected in series with a current limiting resistor and the other of said staionary contacts.

9. A relay flip-flop circuit as set forth in claim 6 wherein
said first set of relay contacts are normally open;
said second set of relay contacts are normally open;
said magnetic latching means is a permanent magnet;
said coil has two windings, the other of said two windings being connected through a current limiting resistor across said source, said windings being adapted to generate opposing magnetic fields when energized, and said winding in series with said input switch also being connected in series with a current limiting resistor;
and a second permanent latching magnet being positioned to latch said second set of relay contacts.

10. A relay flip-flop circuit as set forth in claim 6 wherein
said first set of relay contacts are single-pole double-throw contacts;
said second set of relay contacts is a single-pole double-throw contact having a permanent latching magnetic means positioned to latch said contacts;
said magnetic latching means is a permanent magnet;
said inner coil has two windings connected to be alternately energized through said first set of relay contacts to generate opposing magnetic fields;
and said common coil has two windings connected to be alternately energized through said second set of relay contacts and said input switch to generate opposing magnetic fields.

11. A relay flip-flop circuit as set forth in claim 6 wherein
said first and second sets of relay contacts are reed contacts;
said inner coil is wound around said second set of relay contacts;
and said common coil is wound around both said first and said second sets of relay contacts.

References Cited

UNITED STATES PATENTS

| | | | |
|---|---|---|---|
| 2,974,260 | 3/1961 | Stimler | 317—155.5 X |
| 3,174,080 | 3/1965 | Scott | 317—155.5 |
| 3,174,081 | 3/1965 | Burnett | 317—155.5 |
| 3,182,226 | 5/1965 | Peek | 317—137 |
| 3,244,942 | 4/1966 | Deeg | 317—137 |

LEE T. HIX, *Primary Examiner.*

R. V. LUPO, *Assistant Examiner.*